(12) United States Patent
Tian

(10) Patent No.: US 11,926,413 B2
(45) Date of Patent: Mar. 12, 2024

(54) ENERGY-LOAD ASSSEMBLY FOR AN UNMANNED AERIAL VEHICLE

(71) Applicant: Shandong Dingfeng Aviation Technology Co., Ltd., Jining (CN)

(72) Inventor: Yu Tian, Hong Kong SAR (CN)

(73) Assignee: SHANDONG DINGFENG AVIATION TECHNOLOGY CO., LTD., Shandong Province (CN)

( * ) Notice: Subject to any disclaimer, the term of this patent is extended or adjusted under 35 U.S.C. 154(b) by 270 days.

(21) Appl. No.: 17/220,937

(22) Filed: Apr. 2, 2021

(65) Prior Publication Data

US 2021/0309356 A1      Oct. 7, 2021

(30) Foreign Application Priority Data

Apr. 2, 2020   (CN) .......................... 202020469067.0

(51) Int. Cl.
| | | |
|---|---|---|
| *B64U 60/30* | (2023.01) | |
| *B64C 39/02* | (2023.01) | |
| *B64U 50/34* | (2023.01) | |
| *B64U 101/60* | (2023.01) | |

(52) U.S. Cl.
CPC ............ *B64C 39/024* (2013.01); *B64U 60/30* (2023.01); *B64U 50/34* (2023.01); *B64U 2101/60* (2023.01)

(58) Field of Classification Search
CPC ........ B64U 20/40; B64U 60/30; B64U 60/50; B64U 2101/64; B64U 50/19; B64U 50/30; B64U 50/32; B64U 50/37; B64U 50/39; B64U 2101/60; B64U 50/34; B64C 2201/06; B64C 2201/128; B64C 27/26
See application file for complete search history.

(56) References Cited

U.S. PATENT DOCUMENTS

| | | | | |
|---|---|---|---|---|
| 3,901,732 A | * | 8/1975 | Kalnoki Kis ........... | H01M 6/12 429/162 |
| 4,547,438 A | * | 10/1985 | McArthur ........... | H01M 50/216 429/82 |
| 5,707,757 A | * | 1/1998 | Lee ....................... | H01M 50/30 429/97 |
| 7,843,684 B2 | * | 11/2010 | Lu ........................... | H05K 5/06 165/104.34 |

(Continued)

FOREIGN PATENT DOCUMENTS

| | | | |
|---|---|---|---|
| CN | 105923143 A | * | 9/2016 |
| CN | 111846206 A | * | 10/2020 |

(Continued)

*Primary Examiner* — Christopher D Hutchens
*Assistant Examiner* — Michael A. Fabula
(74) *Attorney, Agent, or Firm* — WPAT LAW, P.C.; Anthony King

(57) ABSTRACT

An energy-load assembly includes an accommodating box, a power source, a load and an undercarriage. The accommodating box can be connected to a body of an unmanned aerial vehicle; the power source is arranged in the accommodating box, and can provide electric energy to the unmanned aerial vehicle; the load is arranged at the bottom of the accommodating box; and the undercarriage is connected to the accommodating box. The energy-load assembly provided integrates the power source, the load and the undercarriage. The corresponding power source and the load can be integrated according to different tasks performed.

3 Claims, 2 Drawing Sheets

(56) References Cited

U.S. PATENT DOCUMENTS

| | | | |
|---|---|---|---|
| 7,929,301 B2 * | 4/2011 | Fong | H05K 5/063 |
| | | | 363/141 |
| 9,619,776 B1 * | 4/2017 | Ford | B64C 39/024 |
| 10,150,579 B2 * | 12/2018 | James | B64F 1/362 |
| 10,169,735 B2 * | 1/2019 | Lund | G06Q 10/08 |
| 10,583,922 B1 * | 3/2020 | Boyes | B64C 1/22 |
| 10,717,524 B1 * | 7/2020 | Boyes | B64D 43/00 |
| 10,809,712 B1 * | 10/2020 | Schaffalitzky | G05D 1/0094 |
| 2014/0272479 A1 * | 9/2014 | Turbe | H01M 50/3425 |
| | | | 429/50 |
| 2016/0129998 A1 * | 5/2016 | Welsh | B64C 27/20 |
| | | | 244/12.3 |
| 2017/0117676 A1 * | 4/2017 | James | B64C 39/024 |
| 2017/0158331 A1 * | 6/2017 | Wu | B64C 39/024 |
| 2017/0197765 A1 * | 7/2017 | Hu | H02J 7/0045 |
| 2017/0300855 A1 * | 10/2017 | Lund | B64F 5/10 |
| 2017/0313421 A1 * | 11/2017 | Gil | G06Q 10/083 |
| 2017/0313422 A1 * | 11/2017 | Gil | G08G 5/0069 |
| 2017/0316375 A1 * | 11/2017 | Gil | G06Q 10/0832 |
| 2017/0316376 A1 * | 11/2017 | Cooper | B64F 1/0299 |
| 2017/0316699 A1 * | 11/2017 | Gil | G01S 19/42 |
| 2017/0316701 A1 * | 11/2017 | Gil | B64F 1/10 |
| 2018/0022451 A1 * | 1/2018 | Lim | B64C 27/08 |
| | | | 244/17.23 |
| 2018/0134388 A1 * | 5/2018 | Gil | B64F 1/22 |
| 2018/0155030 A1 * | 6/2018 | Gil | B64F 1/32 |
| 2018/0155031 A1 * | 6/2018 | Gil | G08G 5/006 |
| 2018/0265222 A1 * | 9/2018 | Takagi | G05D 1/102 |
| 2018/0273158 A1 * | 9/2018 | Courtin | B64C 39/024 |
| 2018/0349840 A1 * | 12/2018 | Gil | G08G 5/006 |
| 2020/0102080 A1 * | 4/2020 | Cuenca | H01M 50/244 |
| 2020/0312162 A1 * | 10/2020 | Tortora | G05D 1/0011 |
| 2020/0317324 A1 * | 10/2020 | Youmans | B64C 39/024 |
| 2021/0171201 A1 * | 6/2021 | Luckay | G05D 1/0011 |
| 2021/0237868 A1 * | 8/2021 | Yamato | B64C 39/024 |
| 2021/0309353 A1 * | 10/2021 | Gil | B64U 30/14 |
| 2021/0309357 A1 * | 10/2021 | Ratajczak | B60L 53/14 |
| 2021/0309358 A1 * | 10/2021 | Ratajczak | B64C 39/024 |
| 2021/0309359 A1 * | 10/2021 | Ratajczak | B64C 25/001 |
| 2021/0309366 A1 * | 10/2021 | Ratajczak | B64D 41/00 |
| 2021/0309388 A1 * | 10/2021 | Ratajczak | B60L 53/14 |
| 2021/0380242 A1 * | 12/2021 | Ratajczak | G05D 1/106 |
| 2022/0135251 A1 * | 5/2022 | Ratajczak | B60L 53/14 |
| | | | 244/17.17 |
| 2022/0204181 A1 * | 6/2022 | Ratajczak | B64C 1/061 |
| 2022/0212814 A1 * | 7/2022 | Ratajczak | G05D 1/101 |
| 2022/0242590 A1 * | 8/2022 | Ratajczak | B64C 39/024 |
| 2022/0324564 A1 * | 10/2022 | Meade | B65D 83/0055 |
| 2022/0363409 A1 * | 11/2022 | Ratajczak | B66C 1/36 |
| 2023/0059896 A1 * | 2/2023 | Ratajczak | B64C 1/061 |

FOREIGN PATENT DOCUMENTS

| | | | | |
|---|---|---|---|---|
| CN | 111846207 A | * | 10/2020 | |
| CN | 112158337 A | * | 1/2021 | A01M 7/0085 |
| WO | WO-2018150748 A1 | * | 8/2018 | A01M 7/00 |

* cited by examiner

ENERGY-LOAD ASSSEMBLY FOR AN UNMANNED AERIAL VEHICLE

TECHNICAL FIELD

The utility model relates to the technical field of unmanned aerial vehicles, and particularly relates to an energy-load assembly and an unmanned aerial vehicle.

BACKGROUND

A pilotless aircraft is also called an unmanned aerial vehicle. It is an unmanned aircraft operated by radio remote control equipment and a self-provided program control device, or it is completely or intermittently operated autonomously by an on-board computer. Unmanned aerial vehicles can be divided into military use and civilian use according to the application field. At present, the unmanned aerial vehicles are widely used in fields such as aerial photography, agriculture, rapid transportation, and disaster relief.

In the prior art, an energy part and a load part on an unmanned aerial vehicle are disposed separately, and are respectively installed in a body of the unmanned aerial vehicle. When performing different tasks, the energy part and the load part are sometimes required to be correspondingly replaced according to types of the tasks and the mileage. However, it is troublesome to replace the energy part and the load part of the existing unmanned aerial vehicle, requiring a lot of time and manpower; a variety of tools are used for assembling and disassembling; the assembling and disassembling efficiency are lower; and damages are easily caused.

SUMMARY

The utility model is directed to provide an energy-load assembly and an unmanned aerial vehicle, which facilitate replacement of an energy part and a load part according to different tasks performed by the unmanned aerial vehicle, and are high in assembling and disassembling efficiency and difficult to damage.

As mentioned above, the technical solution used by the utility model is that:

An energy-load assembly includes:

an accommodating box, the accommodating box being capable of being connected to a body of the unmanned aerial vehicle;

a power source, the power source being arranged in the accommodating box and capable of providing electric energy to the unmanned aerial vehicle;

a load, the load being arranged at the bottom of the accommodating box;

an undercarriage, the undercarriage being connected to the accommodating box.

As a preferred solution of the energy-load assembly, the accommodating box includes:

a box body, one end of which is provided with an opening, the box body accommodating the power source inside;

a box cover, which covers the opening of the box body.

As a preferred solution of the energy-load assembly, the box cover is detachably connected to the box body.

As a preferred solution of the energy-load assembly, a first connecting hole is formed in the box cover; a second connecting hole corresponding to the first connecting hole is formed in the box body; and a first connecting piece is arranged in the first connecting hole and the second connecting hole respectively in a penetrating manner.

As a preferred solution of the energy-load assembly, a fastening slot is formed in one of the box cover and the box body, and a fastener is arranged on the other one; and the fastener can be fastened into the fastening slot.

As a preferred solution of the energy-load assembly, a plurality of heat dissipation holes are formed in a side wall of the box body.

As a preferred solution of the energy-load assembly, an inner surface of the box body and an inner surface of the box cover are both provided with waterproof breathable films.

As a preferred solution of the energy-load assembly, the power source includes a plurality of mutually electrically connected storage batteries.

As a preferred solution of the energy-load assembly, the power source is power oil.

In order to achieve the above-mentioned objective, the utility model further provides an unmanned aerial vehicle, including the energy-load assembly of any of the above solutions.

The utility model has the beneficial effects that:

The energy-load assembly provided by the utility model includes the accommodating box, the power source, the load and the undercarriage. The power source is accommodated in the accommodating box, the load is arranged at the bottom of the accommodating box, and the undercarriage is connected to the accommodating box, so that the energy-load assembly integrates the power source, the load and the undercarriage. The corresponding power source and the load can be integrated according to different tasks performed. During use, the energy-load assembly is overall installed on the body of the unmanned aerial vehicle, which is simple and quick, saves the assembling and disassembling time and improves the assembling and disassembling efficiency; and the power source is hard to damage.

The utility model further provides the unmanned aerial vehicle including the above-mentioned energy-load assembly that can adapt to the unmanned aerial vehicle to perform different tasks and is convenient to use and high in assembling and disassembling. In addition, after the unmanned aerial vehicle finishes the task at each time, the energy-load assembly can be overall removed for charging. At the next performance of a task, the energy-load assembly only needs to be overall installed on the body of the unmanned aerial vehicle without waiting for charging, so that the efficiency is higher.

Figure 1:
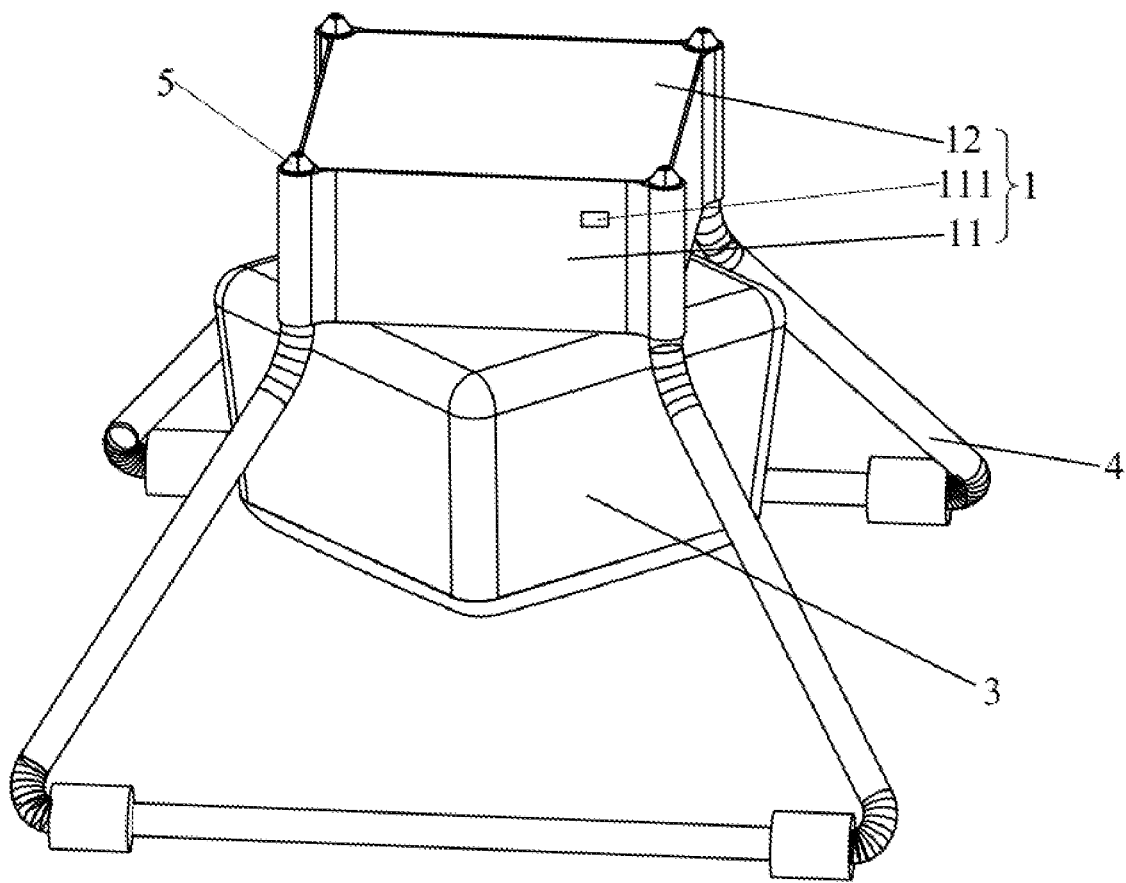
FIG. 1 is a schematic structural diagram of an energy-load assembly provided by the embodiments of the utility model.

1: accommodating box; 11: box body; 111: charge port; 12: box cover;

2: power source; 3: load; 4: undercarriage; 5: guide connecting piece.

DESCRIPTION OF THE EMBODIMENTS

The utility model is further described below in detail in combination with the accompanying drawings and embodiments. It should be understood that the specific embodiments described here are merely to explain the utility model and not intended to limit the utility model. In addition, it should further be noted that for the purpose of facilitating the description, part not all of structures related to the utility model are illustrated only in the accompanying drawings.

In the description of the utility model, unless otherwise clearly specified and defined, the terms "connected", "coupled", and "fixed" should be understood in a broad sense. For example, it can be a fixed connection, a detachable connection, or integration. It can be a mechanical connection or an electrical connection. It can be a direct connection, or an indirect connection through an intermediate medium. It can also be an intercommunication between two elements or the interaction between two elements. Those of ordinary skill in the art can understand the specific meanings of the above terms in the utility model according to specific situations.

In the utility model, unless otherwise clearly defined and defined, the first feature being "above" or "under" the second feature may include that the first and second features are in direct contact, or may include that the first and second features are not in direct contact but in contact through other features between them. Moreover, the first feature being "on", "at the upper side of" and "on the upper surface of" the second feature includes that the first feature is right above and at the oblique upper side of the second feature, or only indicates that the horizontal height of the first feature is greater than that of the second feature. the first feature being "below", "at the lower side of" and "on the lower surface of" the second feature includes that the first feature is right below and at the oblique lower side of the second feature, or only indicates that the horizontal height of the first feature is less than that of the second feature.

In the description of the utility model, orientations or positional relationships indicated by the terms "upper", "lower", "left", "right" and the like are orientations or positional relationships as shown in the drawings, and are only for the purpose of facilitating the description and simplifying the operation, instead of indicating or implying that devices or elements indicated must have particular orientations, and be constructed and operated in the particular orientations, so that these terms are not construed as limiting the utility model. In addition, the terms "first" and "second" are only used to distinguish the description and do not have special meanings.

Figure 2:
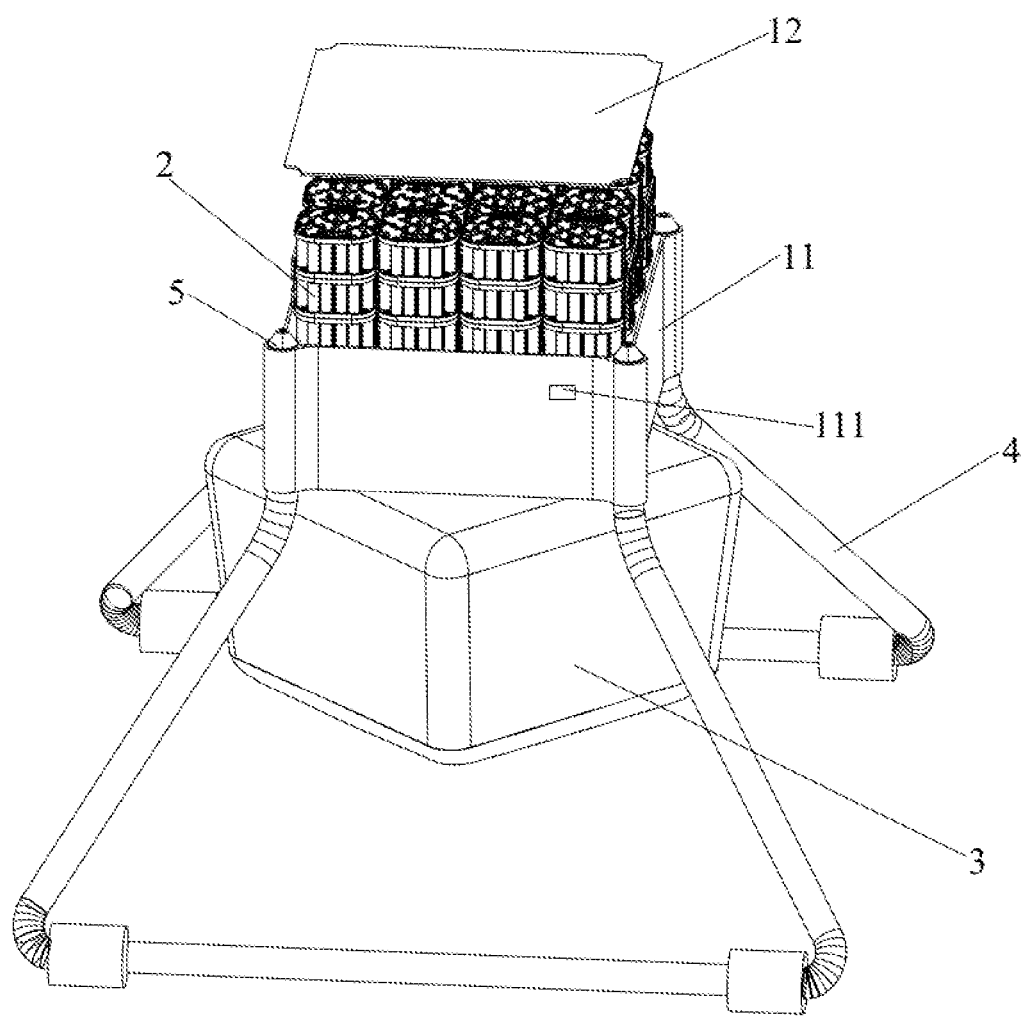
FIG. 2 is a partially exploded diagram of an energy-load assembly provided by the embodiments of the utility model.

As shown in FIG. 1 to FIG. 2, the present embodiment provides an energy-load assembly. The energy-load assembly includes an accommodating box 1, a power source 2, a load 3 and an undercarriage 4. The accommodating box 1 can be connected to a body of an unmanned aerial vehicle; the power source 2 is arranged in the accommodating box 1, and can provide electric energy to the unmanned aerial vehicle; the load 3 is arranged at the bottom of the accommodating box 1; and the undercarriage 4 is connected to the accommodating box 1.

Specifically, the accommodating box 1 is connected to the body of the unmanned aerial vehicle through a guide connecting piece 5. The guide connecting piece 5 can play a role of guiding the installation of the accommodating box 1, and can also realize connection between the accommodating box 1 and the body of the unmanned aerial vehicle. The structure is simple, and the operation is convenient.

The energy-load assembly provided by the present embodiment integrates the power source 2, the load 3 and the undercarriage 4. The corresponding power source 2 and the load 3 can be integrated according to different tasks performed. During use, the energy-load assembly is overall installed on the body of the unmanned aerial vehicle, which is simple and quick, saves the assembling and disassembling time and improves the assembling and disassembling efficiency; and the power source 2 is hard to damage.

Preferably, as shown in FIG. 2, in the present embodiment, the power source 2 includes a plurality of storage batteries electrically connected in sequence; the plurality of storage batteries are stacked in sequence to form a storage battery pack of a cubic structure and are accommodated inside the accommodating box 1; and the storage battery pack is connected to a controller of the unmanned aerial vehicle through a power supply connector and provides electric energy to the unmanned aerial vehicle. After the unmanned aerial vehicle finishes the current task, and an operator removes the energy-load assembly, the storage battery pack can be recharge to facilitate direct use at the next time. Preferably, a charge port 111 is also formed in the accommodating box 1; an external power supply is electrically connected to the charge port 111 to realize a charge process for the storage batteries.

Of course, in other embodiments, the power source 2 may also be power oil. After the unmanned aerial vehicle finishes the current task, and the operator removes the energy-load assembly, the power oil can be supplemented into the accommodating box 1. It can be understood that when the power source 2 is power oil, an oil tank is also arranged in the accommodating box 1. The oil tank is used for bearing the power oil.

Further, the accommodating box 1 includes a box body 11 and a box cover 12. One end of the box body 11 is provided with an opening, and the power source 2 is accommodated in the box body 11; and the box cover 12 covers the opening of the box body 11.

Optionally, the box cover 12 is detachably connected to the box body 11. The box cover 12 is detachably connected to the box body 11 to facilitate the operator to replace the power source 2 inside the accommodating box 1.

In the present embodiment, a first connecting hole is formed in the box cover 12; a second connecting hole corresponding to the first connecting hole is formed in the box body 11; and a first connecting piece is arranged in the first connecting hole and the second connecting hole respectively in a penetrating manner. Optionally, the first connecting hole and the second connecting hole are specifically threaded holes; the first connecting piece is specifically a bolt; and bolted connection has the advantages of simple processing, convenient assembling and disassembling, and stable connection.

Of course, in other embodiments, a fastening slot is formed in one of the box cover 12 and the box body 11, and a fastener is arranged on the other one; and the fastener can be fastened into the fastening slot. Since the fastener and the fastening slot which are fastened with each other are respectively arranged on the box cover 12 and the box body 11, so that detachable connection between the box cover 12 and the box body 11 is realized; and during disassembling, their separation can be realized without using other tools, so that the operation is simple and convenient.

Further, after the unmanned aerial vehicle is used for a long time, the storage battery pack in the accommodating box 1 would generate a large amount of heat. If the heat of the storage battery pack cannot be dissipated in time, the storage batteries may be possibly damaged, affecting the unmanned aerial vehicle to perform a task. In order to solve this problem, a plurality of heat dissipation holes are formed in a side wall of the box body 11 to dissipate the heat inside the accommodating box 1 in time. Optionally, the box body 11 and the box cover 12 may be made of an aluminum alloy material. Compared with other metals, aluminum alloy is lighter in mass and better in heat dissipation effect, can meet the lightweight requirement of the unmanned aerial vehicle, and can also guarantee the heat dissipation effect on the storage batteries.

Further, an inner surface of the box body 11 and an inner surface of the box cover 12 are both provided with waterproof breathable films to avoid water vapor in an external environment from entering the accommodating box 1 to affect the performance of the selected batteries.

Further, in the present embodiment, the load 3 is detachably connected to the bottom of the box body 11. Specifically, a third connecting hole is formed in the load 3; a fourth connecting hole corresponding to the third connecting hole is formed in the box body 11; and a second connecting piece is arranged in the third connecting hole and the fourth connecting hole respectively in a penetrating manner. The third connecting hole and the fourth connecting hole may specifically be threaded holes; the second connecting piece may specifically be a bolt; and bolted connection has the advantages of simple processing, convenient assembling and disassembling, and stable connection.

Of course, in other embodiments, the load 3 may also be welded to the bottom of the box body 11.

It can be understood that the undercarriage 4 is arranged at the bottom of the box body 11, and needs to be avoided from the load 3 to prevent interference between the undercarriage 4 and the load 3.

The present embodiment further provides an unmanned aerial vehicle including the above-mentioned energy-load assembly that can adapt to the unmanned aerial vehicle to perform different tasks and is convenient to use and high in assembling and disassembling. In addition, after the unmanned aerial vehicle finishes the task at each time, the energy-load assembly can be overall removed for charging. At the next performance of a task, the energy-load assembly only needs to be overall installed on the body of the unmanned aerial vehicle without waiting for charging, so that the efficiency is higher.

The above implementation modes only illustrate the basic principles and characteristics of the utility model. The utility model is not limited by the above implementation modes. The utility model further has various changes and modifications without departing from the spirit and scope of the utility model, and these changes and modifications shall all fall within the scope of the utility model. The scope of protection of the utility model is defined by the appended claims and their equivalents.

What is claimed is:

1. An energy-load assembly configured to attach to an unmanned aerial vehicle, said energy-load assembly comprising:
    an accommodating box (1) having four side panels and four corners;
    four guide connecting pieces, each respectively connected to one of the four corners of the accommodating box;
    wherein an upper portion of each of the four guide connecting pieces is configured to attach to a body of the unmanned aerial vehicle;
    a power source (2), the power source (2) being arranged in the accommodating box (1) and capable of providing power to the unmanned aerial vehicle;
    a load (3) directly connected to a bottom of the accommodating box (1);
    an undercarriage (4) having four tubular struts, the four struts each being directly connected to a lower portion of a respective one of the four guide connecting pieces;
    wherein a first of the four struts has a straight body, a neck region, and a foot region, wherein a top of the straight body is directly connected to the neck region that has a bend, wherein the neck region is directly connected to one of said four corners of the accommodating box;
    a first horizontal tubular bar located vertically lower than a bottom of the load (3) and is connected to two of the four struts;
    a second horizontal tubular bar located vertically lower than the bottom of the load (3) and is connected to another two of the four struts;
    wherein the foot region has a bend and is connected to a terminal end of the first horizontal bar;
    wherein each of the first and second horizontal bars has a length longer than any of the four side panels of the accommodating box; and
    a charging port (111) disposed on one of the four side panels.

2. The energy-load assembly according to claim 1, wherein the accommodating box (1) comprises:
    a box body (11), one end of which is provided with an opening, wherein the box body (11) accommodates the power source therein; and
    a box cover (12), which covers the opening of the box body (11).

3. The energy-load assembly according to claim 2, wherein the box cover (12) is detachably connected to the box body (11); wherein the one end provided with an opening is a top end.

* * * * *